Jan. 10, 1928.
R. L. DAVIS
1,656,098
VACUUM TUBE CIRCUITS
Filed Jan. 22. 1924
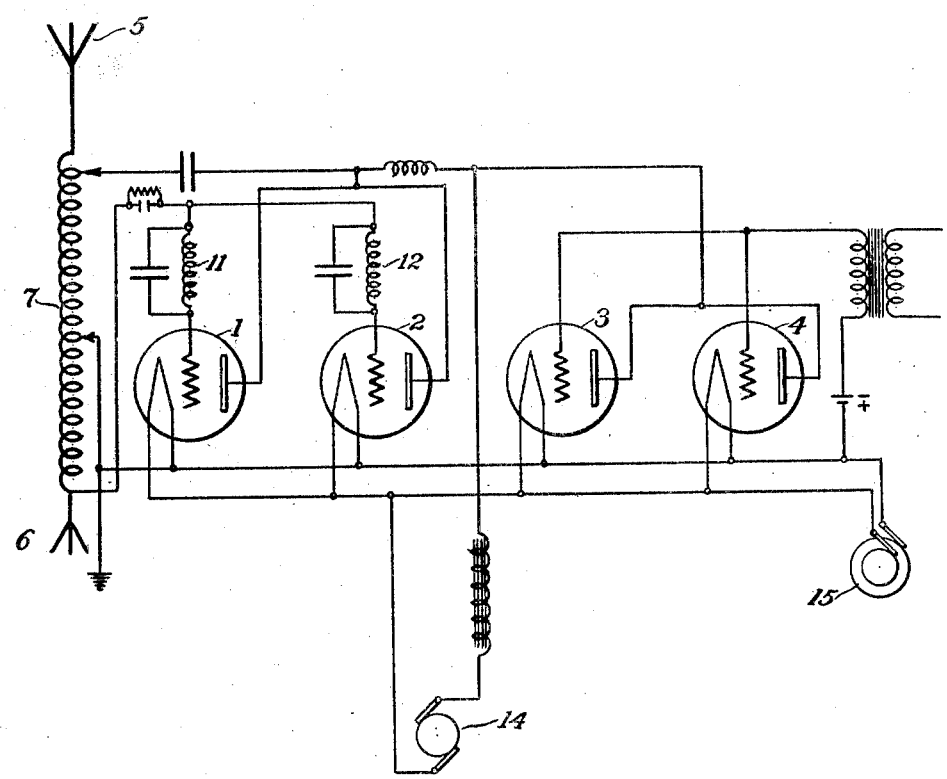
WITNESSES:
INVENTOR
Robert L. Davis
BY
ATTORNEY Patented Jan. 10, 1928.

1,656,098

UNITED STATES PATENT OFFICE.

ROBERT L. DAVIS, OF WILKINSBURG, PENNSYLVANIA, ASSIGNOR TO WESTINGHOUSE ELECTRIC & MANUFACTURING COMPANY, A CORPORATION OF PENNSYLVANIA.

VACUUM-TUBE CIRCUITS.

Application filed January 22, 1924. Serial No. 687,724.

My invention relates to systems for the generation of radio-frequency oscillations.

Broadly speaking, the object of my invention is to stabilize the operation of radio-frequency oscillation generating means and to increase the efficiency of such means.

More specifically, an object of my invention is to produce a system of connections and apparatus for use with a radio-frequency generator including apparatus for insertion in the grid leads of the generator triodes which will stabilize the operation of the generator triodes, increase the efficiency of operation, and damp out parasitic oscillations.

In the construction of radio-frequency generators containing thermionic triodes, difficulty is frequently experienced in adjusting the feed-back means connected to the grid circuits. It has been found that an undesirably large amount of inductance may be required in the grid circuit, resulting in the production of a high voltage upon the grid which makes the operation troublesome and unstable. This effect is particularly undesirable upon apparatus for the generation of extremely short waves.

I have found that the insertion of a frequency trap in the grid circuits markedly increases the stability of operation of a triode oscillator. I have further found that it avoids parasitic oscillations and that it enables the employment of a much lower grid voltage.

Other objects and structural details of my invention will be apparent from the following description when read in connection with the accompanying drawings, wherein:

The single figure is a diagrammatic view of apparatus and circuits embodying my invention.

In the figure are shown four triodes 1, 2, 3 and 4, 1 and 2 being oscillator triodes and 3 and 4 being modulator triodes, connected according to the Heising constant-current modulation system. The figure also shows an aerial 5, a counterpoise 6 and an inductance 7 connected therebetween.

The customary conections for the Heising constant-current modulation system are assembled about the triodes and aerial system. The system of connections also contains filter traps 11 and 12 connected to the grid electrodes of triodes 1 and 2, respectively. Energy for actuation of the system is furnished by a high voltage direct-current source 14 for the plate circuits, and a low voltage source 15 for the filaments.

In the operation of my device, the triodes are energized from the current sources in the usual manner, and oscillations are generated in triodes 1 and 2 and in the connected inductances. These oscillations are stabilized by the presence of filter traps 11 and 12 which apparently serve to adjust the phase displacement necessary between the plate current and grid potential, bringing this relation more precisely to the proper value, thereby producing a reduction in the magnitude of the oscillating voltage required at the grid electrodes.

I find that the resonant oscillation frequency of filter traps 11 and 12 is not at all critical. The resonance frequency of these traps may differ by a substantial percentage from the oscillation frequency, generated by the system as a whole, without diminution of their effectiveness. As before suggested, the action of these filter traps appears to be that of adjusting and correcting the phase relation between the plate current variation and grid potential variation. This action has not as yet been conclusively proven and the advantage gained thereby may be due to other phenomena.

While I have shown only one embodiment of my invention in the accompanying drawings, it is capable of various changes and modifications without departing from the spirit thereof, and it is desired, therefore, that only such limitations shall be imposed thereon as are found in the prior art or are indicated in the appended claim.

I claim as my invention:

In a vacuum-tube device a plurality of vacuum tubes each provided with a grid, a network including said tubes and a conductor common to all of said grids, said conductor having branches, one branch extending to each grid, and parallel-resonant circuits, one in each of said branches, the resonance frequency of said parallel-resonant circuits being approximately that at which parasitic currents tend to occur in said network.

In testimony whereof, I have hereunto subscribed my name this 15th day of January, 1924.

ROBERT L. DAVIS.